(12) United States Patent
Park

(10) Patent No.: US 9,794,461 B2
(45) Date of Patent: Oct. 17, 2017

(54) CAMERA ACTIVATION AND ILLUMINANCE

(71) Applicant: Samsung Electronics Co., Ltd., Gyeonggi-do (KR)

(72) Inventor: Sung-Deuk Park, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 15 days.

(21) Appl. No.: 14/595,807

(22) Filed: Jan. 13, 2015

(65) Prior Publication Data

US 2016/0205301 A1   Jul. 14, 2016

(51) Int. Cl.
| | |
|---|---|
| *H04N 5/232* | (2006.01) |
| *H04N 5/235* | (2006.01) |
| *H04N 5/247* | (2006.01) |
| *H04N 5/225* | (2006.01) |

(52) U.S. Cl.
CPC ......... *H04N 5/2256* (2013.01); *H04N 5/2252* (2013.01); *H04N 5/2258* (2013.01); *H04N 5/232* (2013.01); *H04N 5/2351* (2013.01); *H04N 5/23206* (2013.01); *H04N 5/23216* (2013.01); *H04N 5/23258* (2013.01); *H04N 5/247* (2013.01)

(58) Field of Classification Search
CPC .. A01B 12/006; H04N 5/2252; H04N 5/2258; H04N 5/23206
USPC ...................................... 348/211.2
See application file for complete search history.

(56) References Cited

U.S. PATENT DOCUMENTS

| 9,106,821 | B1* | 8/2015 | Baldwin | H04N 5/23219 |
| 2006/0215076 | A1 | 9/2006 | Karim | |
| 2010/0004031 | A1 | 1/2010 | Kim | |
| 2012/0013584 | A1 | 1/2012 | Senatori | |
| 2014/0063288 | A1* | 3/2014 | Suh | H04N 5/2353 348/229.1 |
| 2014/0184846 | A1 | 7/2014 | Yoon et al. | |
| 2014/0300542 | A1* | 10/2014 | Jakubiak | G06F 3/017 345/157 |
| 2015/0116544 | A1* | 4/2015 | Xu | H04N 5/23245 348/234 |

FOREIGN PATENT DOCUMENTS

| KR | 10-2004-0090820 A | 10/2004 |
| KR | 10-2014-0133370 A | 11/2014 |

OTHER PUBLICATIONS

International Search Report dated Apr. 15, 2016.

* cited by examiner

Primary Examiner — Twyler Haskins
Assistant Examiner — Fayez Bhuiyan
(74) Attorney, Agent, or Firm — Cha & Reiter, LLC

(57) ABSTRACT

Disclosed herein are an electronic device and method for activating a camera. It is identified whether the illuminance received by a second camera is below a threshold. When the illuminance received by the second camera falls below the threshold a predefined function is performed such as activating a first camera.

25 Claims, 13 Drawing Sheets

CAMERA ACTIVATION AND ILLUMINANCE

TECHNICAL FIELD

Examples of the present disclosure relate to an electronic device and method for activating a camera and, more particularly, to a device and method for activating a camera based on an illuminance value.

BACKGROUND

Portable electronic devices have become widely used in today's society due to the various convenient features they provide and their affordable cost. Such devices may be equipped with one or more cameras capable of filming video and taking photographs. Users may store these videos and photographs in their electronic devices and later transmit them to other devices. Thus, users today may readily take photographs, record videos, and share them with friends and family. Furthermore, many applications today allow users to upload pictures and videos immediately to different social media sites.

SUMMARY

As noted above, electronic devices may be equipped with one or more cameras that allow users to record videos and take photographs. A user may click an icon that displays the camera's field of view on a screen. In turn, the user may adjust the position of the device until a desired image is within the camera's field of view. The images perceived by the camera may be shown on the screen whereby the user can then record video or take snapshots of the desired image. Taking a snapshot or recording a video may include clicking a button icon displayed on the screen or clicking a physical button on the body of the device. Unfortunately, clicking such a button may cause the device to rattle or shake upon triggering the camera, which in turn may cause a resulting photograph or video to be blurry or obscure.

In view of the foregoing, disclosed herein are a method and device that activate predetermined function including a camera function based on an illuminance detected by the device. In one example, an electronic device may comprise at least one processor to identify whether an illuminance value received by a second camera is less than an predetermined illuminance value threshold and to activate a predetermined function or a first camera when the illuminance value received by the second camera is less than the predetermined illuminance value threshold.

In a further example, a method may comprise identifying whether an illuminance value received by a second camera is less than an predetermined illuminance value threshold for a predetermined duration of time, and activating a first camera when the illuminance value received by the second camera is less than the predetermined illuminance value threshold for the predetermined duration of time.

The techniques disclosed herein may permit a user to, for example, take a photograph with one camera of a device by placing an object, such as a finger, before another camera of the device without the drawbacks of prior art. Therefore, the techniques disclosed herein may allow a camera to take a photograph or record a video without the shaking or rattling caused by a user touching a physical or virtual camera activation button. Moreover, the teachings of the present disclosure can be applied to activate other function of an electronic device.

The aspects, features and advantages of the present disclosure will be appreciated when considered with reference to the following description of examples and accompanying figures. The following description does not limit the application; rather, the scope of the disclosure is defined by the appended claims and equivalents.

DETAILED DESCRIPTION

Figure 1:
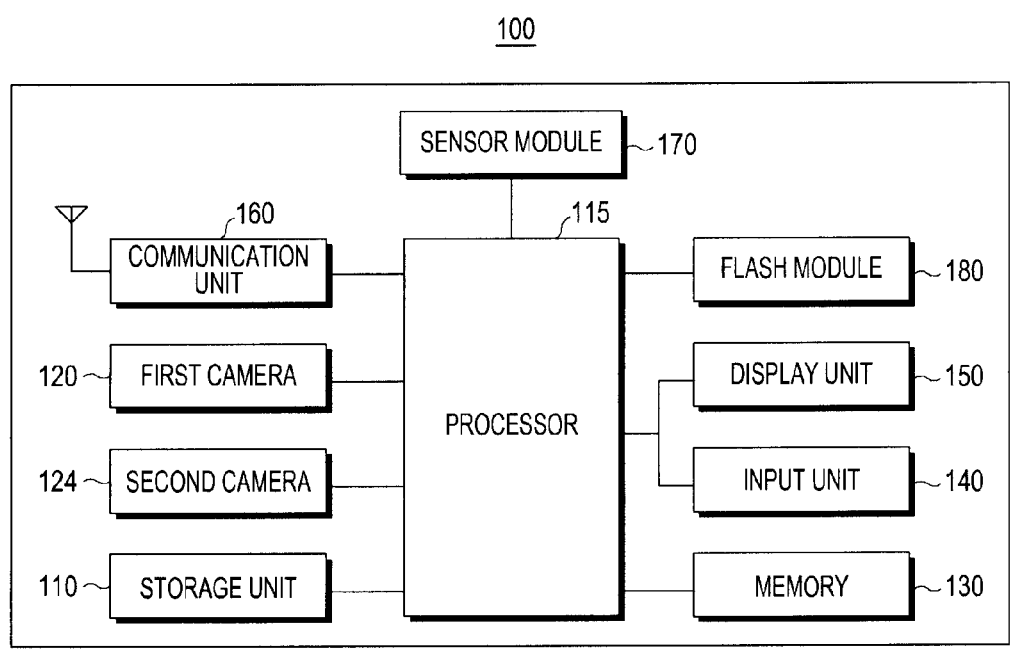
FIG. 1 is a block diagram illustrating an example electronic device in accordance with aspects of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments of the present disclosure may be a device having a communication function. For example, the electronic device may be one or a combination of a smart phone, a tablet Personal Computer (PC), a mobile phone, a video phone, an electronic-book reader, a desktop PC, a laptop PC, a netbook computer, a Personal Digital Assistant (PDA), an MP3 player, a mobile medical equipment, an electronic bangle, an electronic necklace, an electronic appcessory, a camera, a wearable device, an electronic clock, a watch, smart appliances (e.g., a refrigerator, an air-conditioner, a cleaner, an intelligent robot, a television, a DVD player, a stereo, an oven, a microwave oven, a washing machine, an air cleaner, and a digital photo frame), various types of medical equipments (e.g., Magnetic Resonance Angiography (MRA), Magnetic Resonance Imaging (MRI), Computed Tomography (CT), an imaging device, or an ultrasonic imaging device), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a vehicle infotainment device, a ship electronic equipment (e.g., a ship navigation device, a gyro-compass device, a compass), an avionics device, a security equipment, an electronic clothing, an electronic key, a camcorder, a game console, a Head-Mounted Display (HMD) a flat display device, an electronic album, a furniture or a portion of a building/structure including a communication function, an electronic board, an electronic signature receiving device, a projector, various measuring devices (e.g., water, electricity, gas or electro-magnetic wave measuring devices), and/or the like that include communication functionality. Moreover, electronic device 100 may be a mobile terminal or mobile communication terminal, such as a Code Division Multiple Access (CDMA) terminal, a Wideband Code Division Multiple Access (WCDMA) terminal, or a Global System for Mobile communication (GSM) terminal, or may be a terminal such as a Personal Digital Assistant (PDA), a Portable Multimedia Player (PMP), or a Moving Picture Experts Group (MPEG)-1 or MPEG-2 Audio Layer-3 (MP3) player. According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 presents a schematic diagram of an illustrative electronic device 100 for executing the techniques disclosed herein. Electronic device 100 may comprise any device or duplex system capable of processing instructions and transmitting data to and from other devices, including a laptop, a full-sized personal electronic computer, or a mobile terminal (e.g., a smart phone or tablet computer). Electronic device 100 may include all the components normally used in connection an electronic device, including components not shown in FIG. 1.

The example electronic device of FIG. 1 may contain at least one processor 115. Processor 115 is shown in FIG. 1 for ease of illustration, but it is understood that an electronic device may contain any number of processors. In another example, processor 115 may be an application specific integrated circuit ("ASIC"). The processor 115 may manage the overall operation of electronic device 100.

Storage unit 110 may store programs that may be retrieved and executed by processor 115. Storage unit 110 may comprise a program area and a data area. The program area may store programs executable by processor 115. Such programs may include, but are not limited to, an Operating System ("OS") for booting electronic device 100, an application program necessary for reproducing multimedia content, and an application program necessary for other functions. Other functions may include, but are not limited to, a camera function, a sound reproduction function, and an image or video reproduction function. The data area may store data generated by electronic device 100. For example, the data area may be used to store images, videos, a phonebook, or audio data. Storage unit 110 may also be used to store photographs or videos taken with first camera 120 or second camera 124. Storage unit 110 may be any non-volatile storage device.

Input unit 140 may detect input signals entered by a user and may transmit these signals to processor 115. In one example, input unit 140 may include a physical keypad. Such a keypad may be, for example, a QWERTY key pad. In another example, input unit 140 may be a touch panel. In a further example, input unit 140 may comprise a button key, a jog key, and a wheel key. The input unit 140 may generate input signals in accordance with input entered by a user; in turn, processor 115 may detect these signals and execute certain instructions accordingly. Such instructions may be associated with functions that may include, for example, a communication function, a music reproduction function, a moving picture reproduction function, an image display function, a camera photographing function, and a Digital Multimedia Broadcasting (DMB) broadcasting output function.

Sensor module 170 may comprise at least one proximity sensor for detecting a user approaching electronic device 100. The sensor module 170 may further include a motion sensor for detecting a movement of electronic device 100 (e.g., rotation, acceleration, or vibration). Information detected by sensor module 170 may be relayed to processor 115, which may handle the information accordingly.

First camera 120 and second camera 124 may be used to photograph or record video a subject within each camera's field of vision. Each camera may include an image sensor for converting optical signals to electrical signals and a signal processor for converting analog image signals to digital data. The image sensor may be a Charge Coupled Device (CCD) sensor or a Complementary Metal Oxide Semiconductor (CMOS) sensor, the signal processor may be a Digital Signal Processor (DSP). In one example, the image sensor and the signal processor may be formed integrally or separately. The first camera 120 and the second camera 124 may measure an illuminance received by each camera and provide the measured illuminance values to processor 115. In one example, the first camera 120 may be positioned on a front side or surface of electronic device 100, and second camera 124 may be positioned on a rear side or surface of electronic device 100. However, it is understood that the reverse may also be implemented such that the second camera 124 is on the front side and first camera 120 is on the rear side. Alternatively, both first camera 120 and second camera 124 may both be arranged on the same side.

As noted above, first camera 120 and second camera 124 may each measure the illuminance received by each camera. Measuring the illuminance received by each camera is known in the art and may be performed in a variety of ways.

Display unit 150 may be, for example, a Liquid Crystal Display (LCD), Organic Light Emitting Diodes (OLED), and Active Matrix Organic Light Emitting Diodes (AMOLED). Display unit 150 may render a function menu, input data, function setting information, and various other information to a user. Display unit 150 may render various screens that may include, but are not limited to, a booting screen, a standby screen, a menu screen, a communication screen, and/or other application screens associated with electronic device 100.

Memory 130 may include, for example, electronic, magnetic, optical, electromagnetic, or semiconductor media. More specific examples of suitable memory include, but are not limited to, a portable magnetic electronic device diskette, such as floppy diskettes or hard drives, a read-only memory ("ROM"), an erasable programmable read-only memory, a portable compact disc or other storage devices that may be coupled to electronic device 100 directly or indirectly. Memory 130 may also include any combination of one or more of the foregoing and/or other devices as well.

Flash module 180 can provide lighting in conjunction with the camera module 120 and/or 124 obtaining images of the external environment.

The Communication unit 160 may transmit and receive data using wireless communication. The Communication unit 160 may include an RF transmitter for up-converting a frequency of a signal to be transmitted and amplifying the signal, and an RF receiver for down-converting a frequency of a received signal and low-noise amplifying the signal. Further, communication unit 160 may receive data through a wireless channel and relay the data to processor 115. Thus, electronic device 100 may be interconnected to other electronic devices via a network, which may be a local area network ("LAN"), wide area network ("WAN"), the Internet, etc. Such a network may use various protocols including virtual private networks, local Ethernet networks, private networks using communication protocols proprietary to one or more companies, cellular and wireless networks, HTTP, and various combinations of the foregoing.

Figure 2:
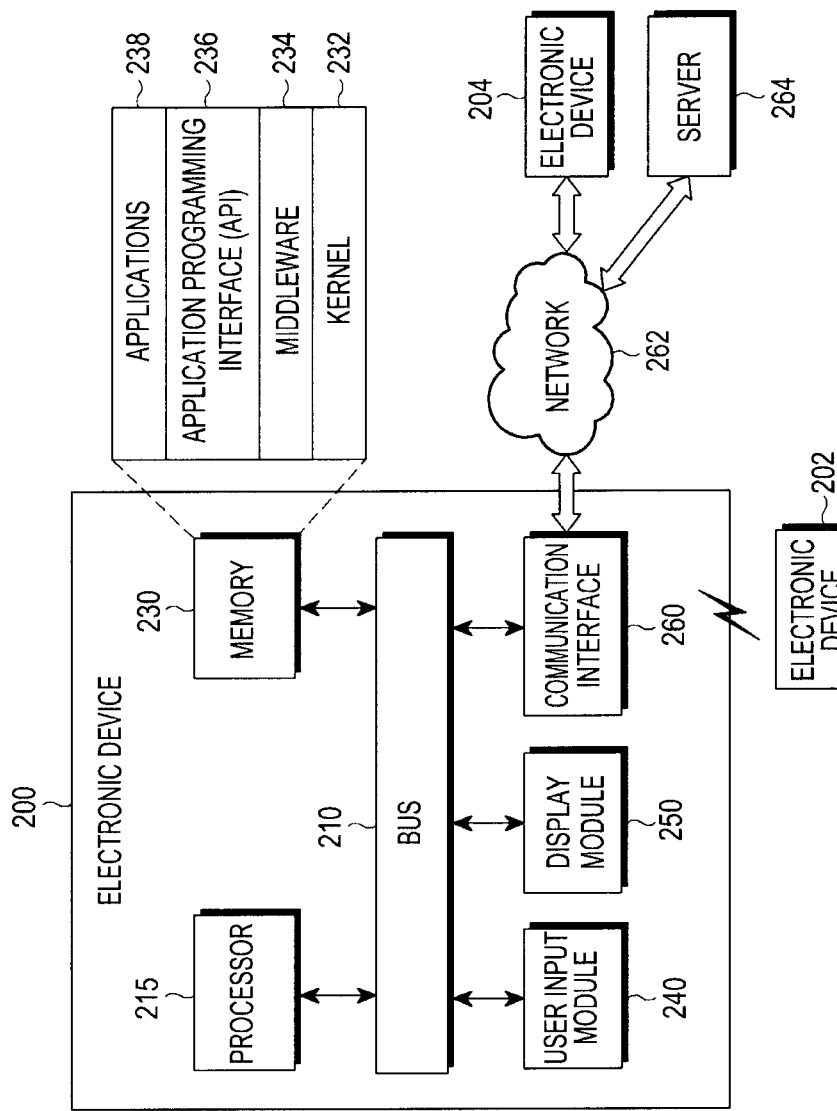
FIG. 2 is a block configuration of an electronic device according to an embodiment of the present disclosure.

FIG. 2 is a diagram illustrating a block configuration of an electronic device in a network environment according to an embodiment of the present disclosure.

Referring to FIG. 2, the electronic device 200 may include a bus 210, a processor 215, a memory 230, a user input module 240, a display module 250, and a communication module 260.

The bus 210 may be a circuit for connecting the above-described components to one another and transferring communication (e.g., a control message) between the above-described components.

The processor 215 may receive an instruction from the above-described component (e.g., the memory 230, the user input module 240, the display module 250, or the communication module 260) through, for example, the bus 210, decode the received instruction, and perform data operations or data processing according to the decoded instruction.

The memory 230 may store an instruction or data that is received from or generated by the processor 215 or another component (e.g., the user input module 240, the display module 250, the communication module 260, and/or the like).

The memory 230 may include programming modules, such as a kernel 232, middleware 234, an Application Programming Interface (API) 236, an application 238, and/or the like. The above-described programming modules may be respectively configured by software, firmware, hardware or any combination of at least two thereof.

The kernel 232 may control or manage system resources (e.g., the bus 210, the processor 215, or the memory 230) used to perform an operation or function implemented by another remaining programming module, for example, the middleware 234, the API 236, the application 238, and/or the like. The kernel 232 may provide an interface for allowing the middleware 234, the API 236, the application 238, and/or the like to access and control or manage respective components of the electronic device.

The middleware 234 may perform a relay function such that the API 236 or the application 238 communicates with the kernel 232 for transmission and reception of data. In addition, the middleware 234 may perform load balancing of transaction requests received from a plurality of applications 238 in such a way that a priority of using the system resources (e.g., the bus 210, the processor 215, or the memory 230) of the electronic device 200 is assigned to at least one application of the plurality of applications 238 according to the transaction requests.

The API 236 may be an interface for enabling the applications 238 to control functions provided by the kernel 232 or the middleware 234 and includes, for example, at least one interface or function for file control, window control, image processing, or character control.

The user input module 240 may receive an instruction or data from, for example, a user and transfer the instruction or data to the processor 215 or the memory 230 through the bus 210. The display module 250 may display an image, moving images or data to the user. The user input module 240 may be configured as a touch screen. The user input module 140 may include one or more keys, buttons, or the like.

The communication module 260 may perform communication between another electronic device 202 and the electronic device 200 and support a predetermined short-range communication protocol (e.g., WiFi, Blue Tooth (BT), Near-Field Communication (NFC), or a predetermined network communication 262 (e.g., Internet, Local Area Network (LAN), Wire Area Network (WAN), telecommunication network, cellular network, satellite network or Plain Old Telephone Service (POTS), and/or the like). The electronic devices 202 and 204 may be a device identical to (e.g., the same type as or different from (e.g., the different type from) the electronic device 200 respectively. The electronic device 200 may communicate with a server 264 using the communication module 260.

Figure 3:
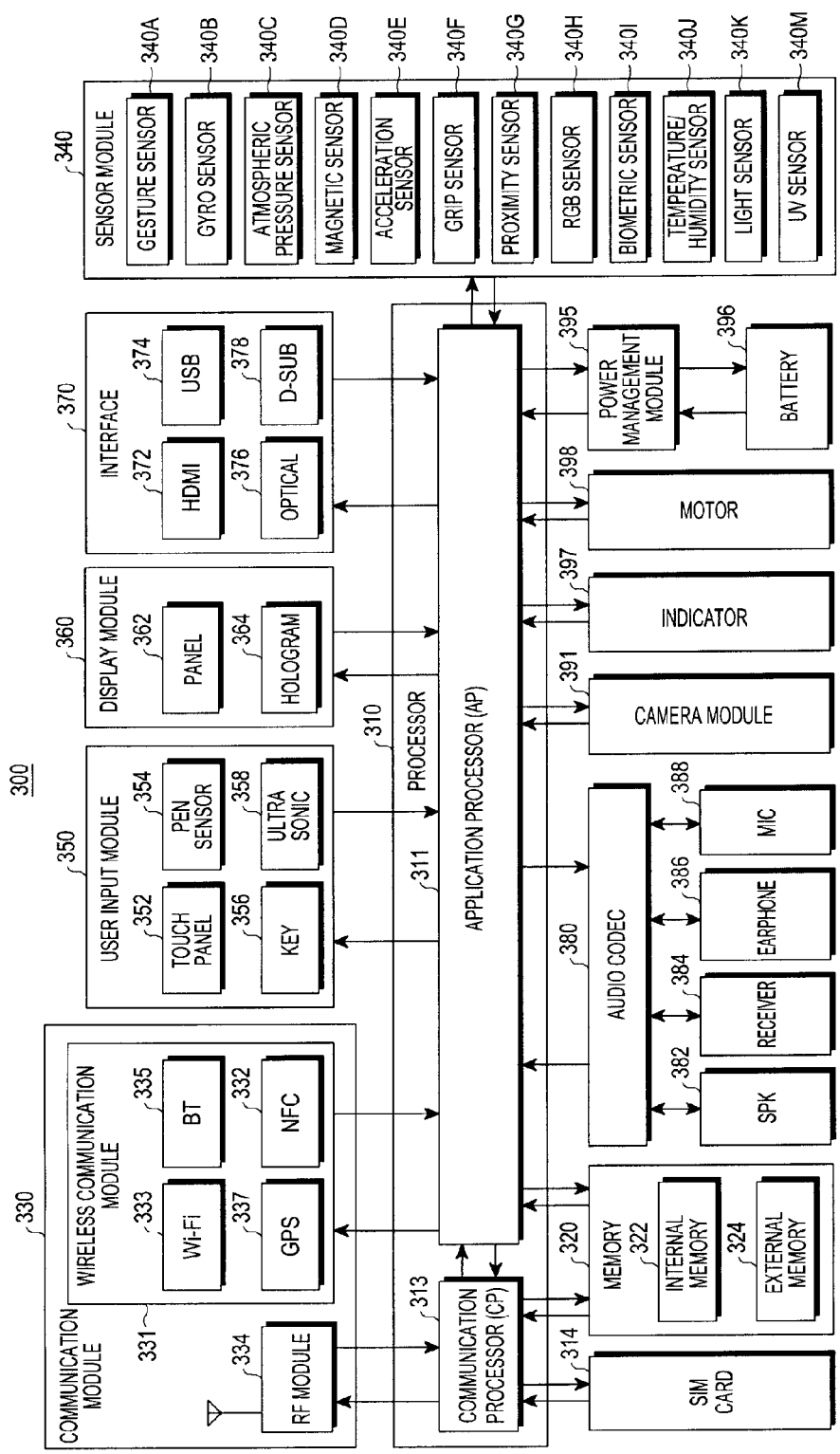
FIG. 3 is a block diagram of hardware according to an embodiment of the present disclosure.

FIG. 3 is a block diagram of hardware according to an embodiment of the present disclosure. The hardware 300 may be, for example, the electronic device 100 or 200 illustrated in FIG. 1 or FIG. 2.

Referring to FIG. 3, the hardware 300 may include at least one processor 310, a Subscriber Identification Module (SIM) card 314, a memory 320, a communication module 330, a sensor module 340, a user input module 350, a display module 360, an interface 370, an audio codec 380, a camera module 391, a power management module 395, a battery 396, an indicator 397, or a motor 398.

The processor 310 (e.g., the processor 215 illustrated in FIG. 2) may include at least one Application Processor (AP) 311 and/or at least one Communication Processor (CP) 313. The processor 310 may be, for example, the processor 215 illustrated in FIG. 2. Although the AP 311 and the CP 313 are illustrated as being included in the processor 310 in FIG. 3, the AP 311 and the CP 313 may be respectively included in different IC packages. According to various embodiments of the present disclosure, the AP 311 and the CP 313 may be included in one IC package.

The AP 311 may execute an operating system or application programs to control a plurality of hardware or software components and perform data processing and data operations on various kinds of data including multimedia data. The AP 311 may be implemented by, for example, a System on Chip (SoC). According to various embodiments of the present disclosure, the processor 310 may further include a Graphic Processing Unit (GPU) (not illustrated). The CP 313 may perform a function of managing data links for communication between an electronic device (e.g., the electronic device 100) including the hardware 300 and other electronic devices connected to the electronic device through networks and converting communication protocols. The CP 313 may be implemented by, for example, a SoC.

According to various embodiments of the present disclosure, the CP 313 may perform at least one of multimedia control functions. The CP 313 may perform terminal identification and authentication using, for example, a subscriber identification module (e.g., the SIM card 314) within a communication network. In addition, the CP 313 may provide services, such as a voice call, a video call, a text message, packet data, and/or the like to a user. In addition, the CP 313 may control the data transmission and reception of the communication module 330. Although the components, such as the CP 313, the power management module 395, the memory 320, and/or the like are illustrated as being provided separately from the AP 311 in FIG. 3, the AP 311 may be implemented to include at least one (e.g., the CP 313) of the above-described components according to various embodiments of the present disclosure.

The memory 320 may include an internal memory 322 or an external memory 324. The memory 320 may be, for example, the memory 230 illustrated in FIG. 2. The internal memory 322 may include at least one of a volatile memory (e.g., Dynamic Random-Access Memory (DRAM), Static Random-Access Memory (SRAM), Synchronous Dynamic Random-Access Memory (SDRAM), and/or the like) or a nonvolatile memory (e.g., One-Time Programmable Read Only Memory (OTPROM), Programmable Read Only Memory (PROM), Erasable Programmable Read Only Memory (EPROM), Electrically Erasable Programmable Read Only Memory (EEPROM), mask ROM, flash ROM, NAND flash memory, NOR flash memory, and/or the like). According to various embodiments of the present disclosure, the internal memory 322 may have a Solid State Drive (SSD) type. The external memory 324 may further include, for example, a Compact Flash (CF) card, a Secure Digital (SD) card, a Micro Secure Digital (Micro-SD) card, a Mini Secure Digital (Mini-SD) card, an extreme Digital (xD) card, a memory stick, and/or the like.

The communication module 330 may include a wireless communication module 331 or an RF module 334. The communication module 330 may be, for example, the communication unit 160 illustrated in FIG. 1. The wireless communication module 331 may include, for example, a WiFi module 333, a Bluetooth (BT) module 335, GPS 337 or a NFC module 339. For example, the wireless communication module 331 may provide a wireless communication function by using radio frequencies. The wireless communication module 331 may include an IR module (e.g., that communicates using Infrared Data Association (IrDA) technology). Additionally, or alternatively, the wireless communication module 331 may include a network interface (e.g., LAN card) or a modem which connects the hardware 300 to a network (e.g., Internet, LAN, WAN, telecommunication network, cellular network, satellite network or POTS, and/or the like).

The RF module 334 may perform transmission and reception of data, for example, transmission and reception of RF signals or requested electronic signals. Although not illustrated, the RF module 334 may include, for example, a transceiver, a Power Amp Module (PAM), a frequency filter, or a Low Noise Amplifier (LNA), and/or the like. The RF module 334 may further include a component for transmitting and receiving electromagnetic waves in free space for wireless communication, for example, a conductor or a conductive line.

The sensor module 340 may include at least one of, for example, a gesture sensor 340A, a gyro sensor 340B, a barometer 340C, a magnetic sensor 340D, an acceleration sensor 340E, a grip sensor 340F, a proximity sensor 340G, a Red-Green-Blue (RGB) sensor 340H, a biophysical sensor 340I, a temperature/humidity sensor 340J, a light sensor 340K, an Ultra Violet (UV) sensor 340M, and/or the like. The sensor module 340 may measure a physical amount or detect the operation state of the electronic device and convert measured or detected information into an electrical signal.

Additionally or alternatively, the sensor module 340 may include, for example, an E-nose sensor (not illustrated), an ElectroMyoGraphy (EMG) sensor (not illustrated), an ElectroEncephaloGram (EEG) sensor, (not illustrated), an ElectroCardioGram (ECG) sensor (not illustrated), an iris sensor, a fingerprint sensor, and/or the like. The sensor module 340 may further include a control circuit for controlling at least one sensor included therein. The user input module 350 may include a touch panel 352, a (digital) pen sensor 354, a key 356, or an ultrasonic input device 358. The user input module 350 may be, for example, the user input unit 140 illustrated in FIG. 1. The touch panel 352 may recognize a touch input using at least one method of, for example, a capacitive method, a pressure-sensitive method, an IR method, an ultrasonic method, and/or the like.

In addition, the touch panel 352 may further include a controller (not illustrated). In the case of the capacitive method, the touch panel 352 may detect a direct touch and a proximity event (e.g., proximity recognition is possible with a touch panel 352 using a capacitive recognition method). The touch panel 352 may further include a tactile layer. In this case, the touch panel 352 may provide a tactile response to a user. The (digital) pen sensor 354 may be implemented by using, for example, a method identical or similar to a method for receiving a touch input or a separate recognition sheet. For example, a keypad, a touch key, and/or the like may be used as the key 356.

The ultrasonic input device 358 may be a device for detecting a sound wave using a microphone (e.g., the microphone 388) and identifying data in a terminal, through a pen for generating an ultrasonic signal to facilitate wireless recognition. According to various embodiments of the present disclosure, the hardware 300 may receive a user input from an external device (e.g., a network, a computer, a server, and/or the like) connected thereto by using the communication module 330.

The display module 360 may include a panel 362 and a hologram 364. The display module 360 may be, for example, the display unit 150 illustrated in FIG. 1. The panel 362 may be, for example, a Liquid Crystal Display (LCD) panel an Active Matrix Organic Light-Emitting Diode (AMOLED) panel, and/or the like. The panel 362 may be implemented to be, for example, flexible, transparent, or wearable.

The panel 362 may be formed as one module with the touch panel 352. The hologram 364 may enable a 3D image to be viewed in space using optical interference. According to various embodiments of the present disclosure, the display module 360 may further include a control circuit for the panel 362 and the hologram 364.

The interface 370 may include, for example, a HDMI 372, an USB 374, a projector 376, or a D-sub 378. Additionally or alternatively, the interface 370 may include, for example, a Secure Digital (SD)/Multi-Media Card (MMC) interface (not illustrated) an Infrared Data Association (IrDA) interface (not illustrated), and/or the like.

The audio codec 380 may perform conversion between voice and electrical signals. The audio codec 380 may perform conversion of voice information input or output through, for example, a speaker 382, a receiver 384, an earphone 386, a microphone 388, and/or the like.

The camera module 391 may be a device for capturing an image and moving images. According to an embodiment of the present disclosure, the camera module 391 may include at least one image sensor (e.g., a front lens or a rear lens), an image signal processor (not illustrated), or a flash LED (not illustrated).

The power management module 395 may manage power of the hardware 300. Although not illustrated, the power management module 395 may include, for example, a Power Management IC (PMIC), a charger IC, a battery gage, and/or the like. The PMIC may be mounted within, for example, an integrated circuit or a SoC semiconductor. A charging method may include a wired charging method and a wireless charging method. The charger IC may charge a battery and prevent the application of overvoltage or over-current from a charger. According to various embodiments of the present disclosure, the charger IC may include a charger IC employing at least one of a wired charging method or a wireless charging method. The wireless charging method may include, for example, a magnetic resonance method, a magnetic induction method, or an electromagnetic wave method. For example, an additional circuit for wireless charging, for example, a coil loop, a resonance circuit, or a rectifier may be included.

A battery gage may measure, for example, an amount of power remaining or a voltage, a current, or a temperature during charging with respect to the battery 396. The battery 396 may generate electricity and supply power and may be, for example, a rechargeable battery.

The indicator 397 may represent a specific state of the hardware 300 or a component thereof (e.g., the AP 311), for example, a booting state, a message state, a charge state, and/or the like.

The motor 398 may convert an electrical signal into mechanical vibration.

Although not illustrated, the hardware 300 may include a processing device (e.g., a Graphical Processing Unit (GPU)) for supporting a mobile TV. The processing device for supporting a mobile TV may process media data based on, for example, Digital Media Broadcast (DMB), Digital Video Broadcasting (DVB) or Media Flo™. The names of the above-described components of the hardware according to various embodiments of the present disclosure may vary according to the types of the electronic device. The hardware according to various embodiments of the present disclosure may be configured by including at least one of the above-described components. Some components may be omitted from, or additional other components may be further included in the hardware. When some of the components of the hardware according to various embodiments of the present disclosure are combined into one entity, the one entity may perform the functions of the components before combination.

Figure 4:
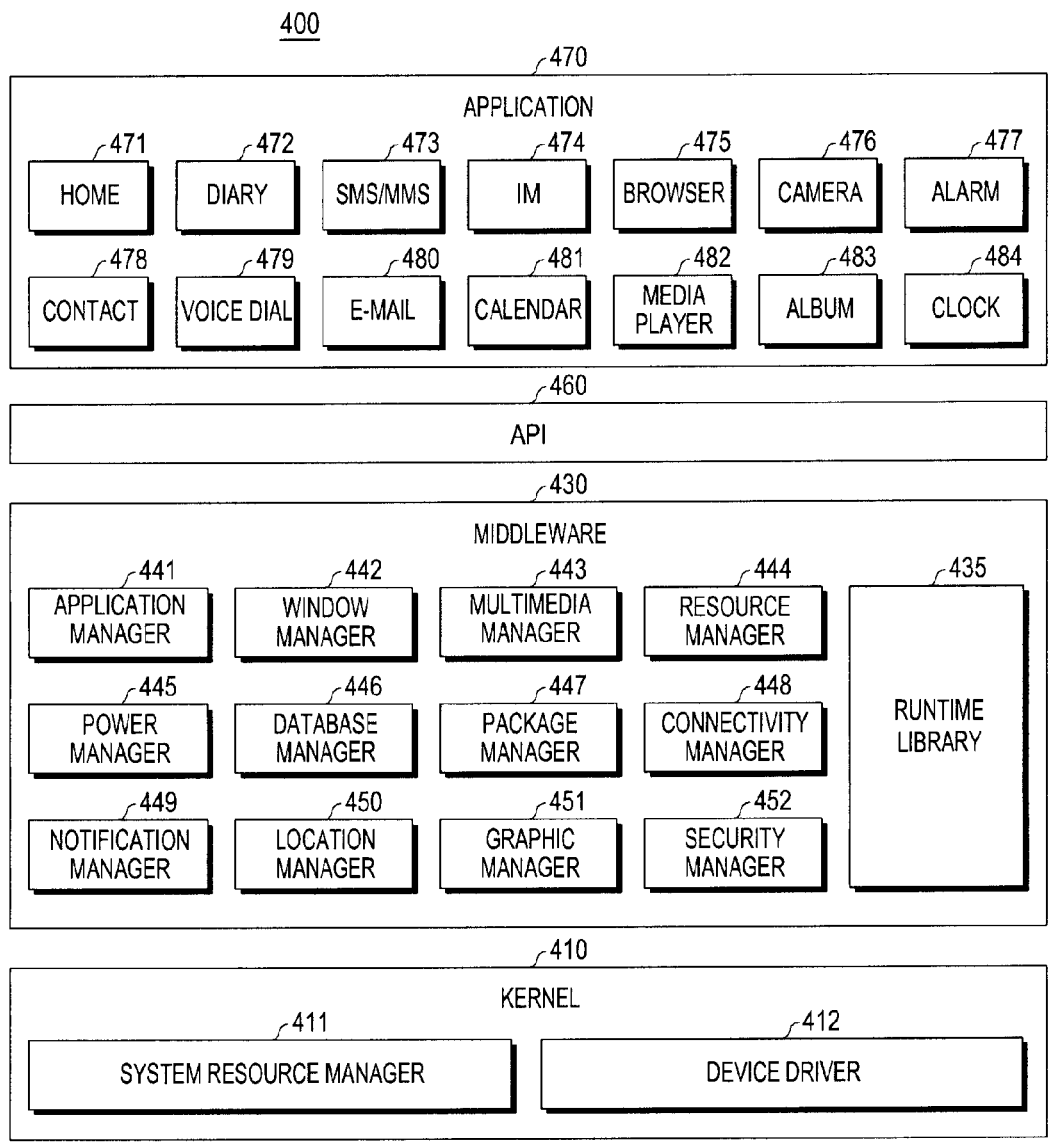
FIG. 4 is a block diagram of a programming module according to an embodiment of the present disclosure.

FIG. 4 is a block diagram of a programming module according to an embodiment of the present disclosure.

Referring to FIG. 4, the electronic device may include a programming module 300. For example, the programming module 400 may be included (e.g., stored) in the electronic device 200 (e.g., the memory 230) illustrated in FIG. 2. At least one component of the programming module 400 may be configured by software, firmware, hardware, or a combination of at least two thereof.

The programming module 400 may be implemented in hardware (e.g., the hardware 300) and may include an electronic device (e.g., an Operating System (OS) that controls resources associated with the electronic device 100 or various applications (e.g., the applications 470 running on the operating system). For example, the operating system may be Android, iOS, Windows, Symbian, Tizen, or Bada. Referring to FIG. 4, the programming module 400 may include a kernel 410, middleware 430, an application programming interface 460, or applications 470.

The kernel 410 (e.g., the kernel 232 of FIG. 2) may include a system resource manager 411, a device driver 412, and/or the like. The system resource manager 411 may include, for example, a process management unit (not shown), a memory management unit (not shown), a file system management unit (not shown), and/or the like. The system resource manager 411 may perform control, allocation or deallocation of system resources. The device driver 412 may include, for example, a display driver (not shown), a camera driver (not shown), a Bluetooth driver (not shown), a shared memory driver (not shown), an USB driver (not shown), a keypad driver (not shown), a WiFi driver (not shown), an audio driver (not shown), and/or the like.

According to various embodiments of the present disclosure, the device driver 412 may include an Inter-Process Communication (IPC) driver (not illustrated). The middleware 430 may include a plurality of modules which are implemented in advance in order to provide functions needed by the applications 370 in common. In addition, the middleware 430 may provide functions through the API 460 such that the applications 470 efficiently use limited system resources within the electronic device. For example, as illustrated in FIG. 4, the middleware 430 (e.g., the middleware 234 illustrated in FIG. 2) may include at least one of a runtime library 435, an application manager 441, a window manager 442, a multimedia manager 443, a resource manager 444, a power manager 445, a database manager 446, a package manager 447, a connection manager 448, a notification manager 449, a location manager 450, a graphic manager 451, or a security manager 452.

The runtime library 435 may include a library module to be used by a compiler in order to provide a new function through programming language during execution of the applications 470. According to various embodiments of the present disclosure, the runtime library 435 may perform functions for input/output, memory management, arithmetic functions, and/or the like.

The application manager 441 may manage, for example, a life cycle of at least one application of the applications 470.

The window manager 442 may manage Graphical User Interface (GUI) resources used for a screen.

The multimedia manager 443 may identify formats required for playback of various media files and perform encoding and decoding on media files by using codecs suitable for the formats.

The resource manager 444 may manage resources, such as source codes, memory, storage space, and/or the like for at least one of the applications 470.

The power manager 445 may manage a battery or power in cooperation with BIOS and provide power information needed for operation.

The database manager 446 may manage the generation, search or modification of a database to be used by at least one application of the applications 470.

The package manager 447 may manage installation and update of an application provided in the form of a package file.

The connection manager 448 may manage wireless connection for WiFi, Bluetooth, and/or the like.

The notification manager 449 may display or notify an event, such as message arrival, a promise, proximity, an alarm to a user in the form of not disturbing the user.

The location manager 450 may manage location information of the electronic device.

The graphic manager 451 may manage graphic effects to be provided to the user or a relevant user interface.

The security manager 452 may provide various security functions required for system security and user authentication.

According to various embodiments of the present disclosure, if the electronic device (e.g., electronic device 100) has a telephone function, the middleware 430 may further include a telephony manager for management of a voice and video call function of the electronic device.

The middleware 430 may generate and use a new middleware through various function combinations of the above-described component modules. The middleware 430 may provide specialized modules for respective operating system types in order to a special function. In addition, the middleware 430 may dynamically delete some of existing components or add new components. Accordingly, some of components provided in various embodiments of the present disclosure may be omitted or other components may be further provided. In addition, a component for performing a similar function may be substituted.

The API 460 (e.g., the API 236 of FIG. 2) may be a set of API programming functions and another API having a different configuration may be provided according to operating systems. For example, in the case of Android or IOS, one API set may be provided for each platform. In the case of Tizen, two or more API sets may be provided. The applications 470 (e.g., the application 238 of FIG. 2) may include a preloaded application or a third party application.

According to various embodiments of the present disclosure, the electronic device may have one or more applications stored thereon. For example, the applications 470 may include a home application 471, a dialer application 472, a messaging application (e.g., Short Message Service, Multimedia Message Service, and/or the like) 473, an instant messaging application 474, a browser application 475, a camera application 476, an alarm application 477, a contact application 478, a voice dial application 479, an email application 480, a calendar application 481, a media player application 482, an album application 483, a clock application 484, and/or the like.

The programming module 400 may be at least partially implemented by instructions stored in a non-transitory storage medium readable by a computer. When the instructions are executed by at least one processor (e.g., the processor 215 of FIG. 2), the at least one processor may perform a function corresponding to the instructions. The non-transitory storage medium readable by a computer may be, for example, the memory 320. The programming module 400 may be at least partially implemented (e.g., executed) by, for example, the processor 310.

The programming module 400 may at least partially include a module, a routine, a set of instructions or a process for performing at least one function. The names of components of the programming module (e.g., the programming module 400) according to various embodiments of the present disclosure may be changed according to operating systems. In addition, the programming module according to various embodiments of the present disclosure may include at least one of the above described components. Some of the components may be omitted from the programming module or other additional components may be further included in the programming module.

It should be noted that the operational principle of various embodiments of the present disclosure will be described herein below with reference to the accompanying drawings. In the following description, detailed descriptions of well-known functions or configurations will be omitted because such detailed descriptions may unnecessarily obscure the subject matters of the present disclosure. Furthermore, terms to be described below have been defined by considering functions in various embodiments of the present disclosure, and may be defined differently depending on a user or operator's intention or practice. Therefore, the terms used herein should be understood based on the descriptions made herein.

Figure 5:
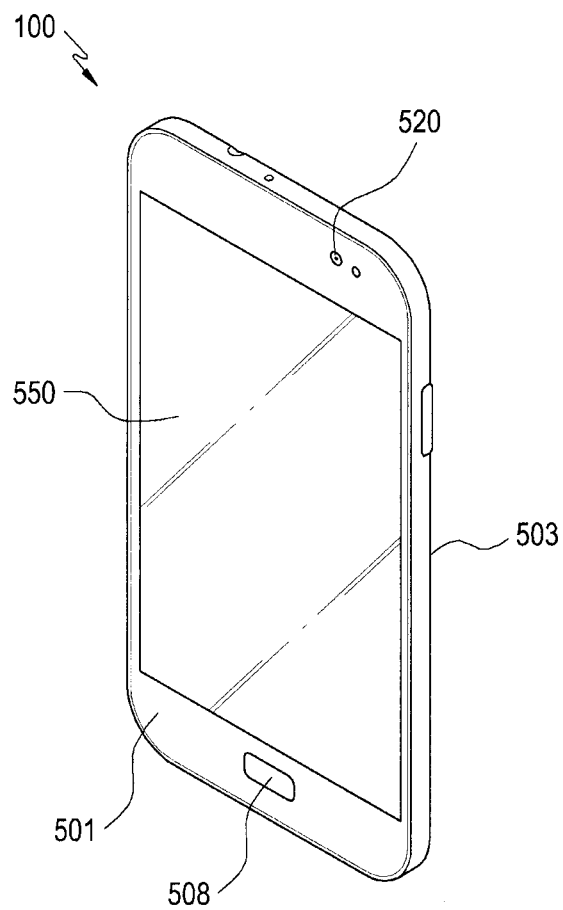
FIG. 5 is a front perspective view of an example electronic device in accordance with aspects of the present disclosure.
Figure 6:
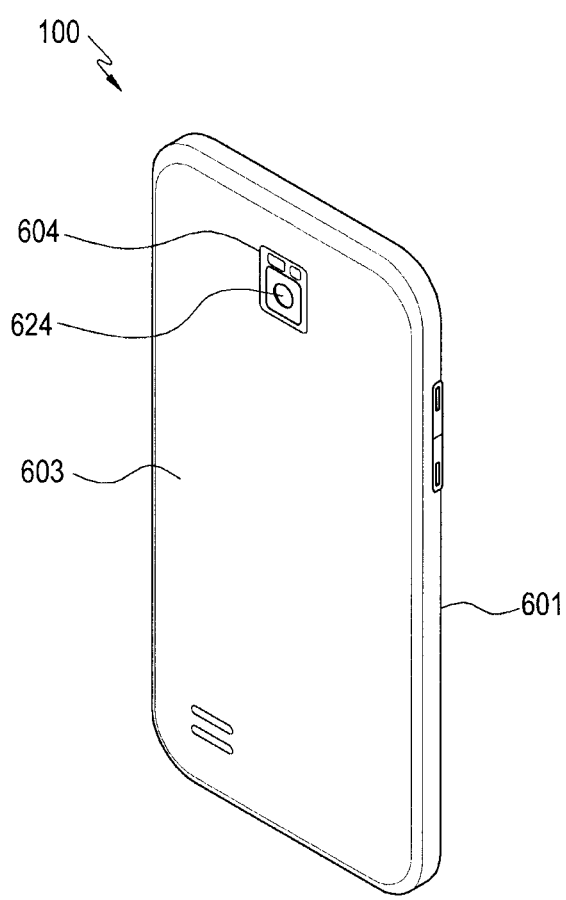
FIG. 6 is a rear perspective view of an example electronic device in accordance with aspects of the present disclosure.

Referring now to FIGS. 5-6, a front and rear perspective view of an example electronic device 100 is shown. While electronic device 100 shown in FIGS. 5-6 comprise a bar body type, it is understood that the electronic device is not limited to the type of body illustrated herein and that various structures may be employed, such as a slide type, a folder type, a swing type, a swivel type, and the like that includes two or more cases.

Referring to FIG. 5, the example body of electronic device 100 includes a front case 501 and a rear case 503. These cases together may form an exterior such that various electronic components may be included in a space formed between front case 501 and rear case 503. Front case 501 and rear case 503 may be manufactured by catapulting synthetic resins, or may be formed of metal such as stainless steel (STS), titanium (Ti), or the like.

FIG. 5 also depicts a display unit 550 that may correspond to display unit 150 of FIG. 1. FIG. 5 shows other hardware items that may be included in a device, such as a home screen button 508 for instructing processor 115 to render a home screen on display unit 550, and a power button (not shown) for powering electronic device 100 on or off. In addition, FIG. 5 shows first camera 520 situated on front case 501 to allow a user to take a self-snapshot while interacting with display unit 550.

Referring now to the example rear view in FIG. 6, second camera 624 is shown positioned on rear case 603. Also positioned on rear case 603 is a flash module 604 for generating light toward a subject, when the subject is being photographed by second camera 624. A user may alternate between first camera 520 and second camera 624 using a software interface associated with the cameras. While FIGS. 5-6 show first camera 520 and second camera 624 arranged on front case 501 and rear case 603 respectively, it is understood that second camera 624 may be arranged on front case 601 and first camera 520 may be arranged on rear case 503; alternatively, both first camera 520 and second camera 624 may be arranged together on front case 501 or both cameras may be arranged together on rear case 603.

Figure 7:
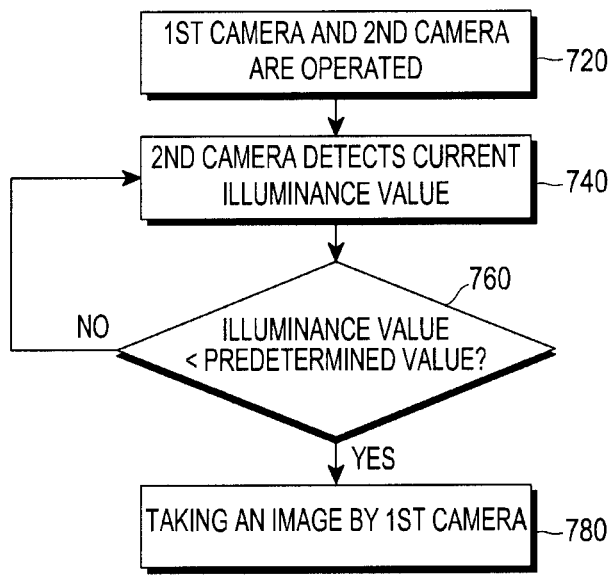
FIG. 7 is a flow diagram of an example method in accordance with aspects of the present disclosure.
Figure 8:
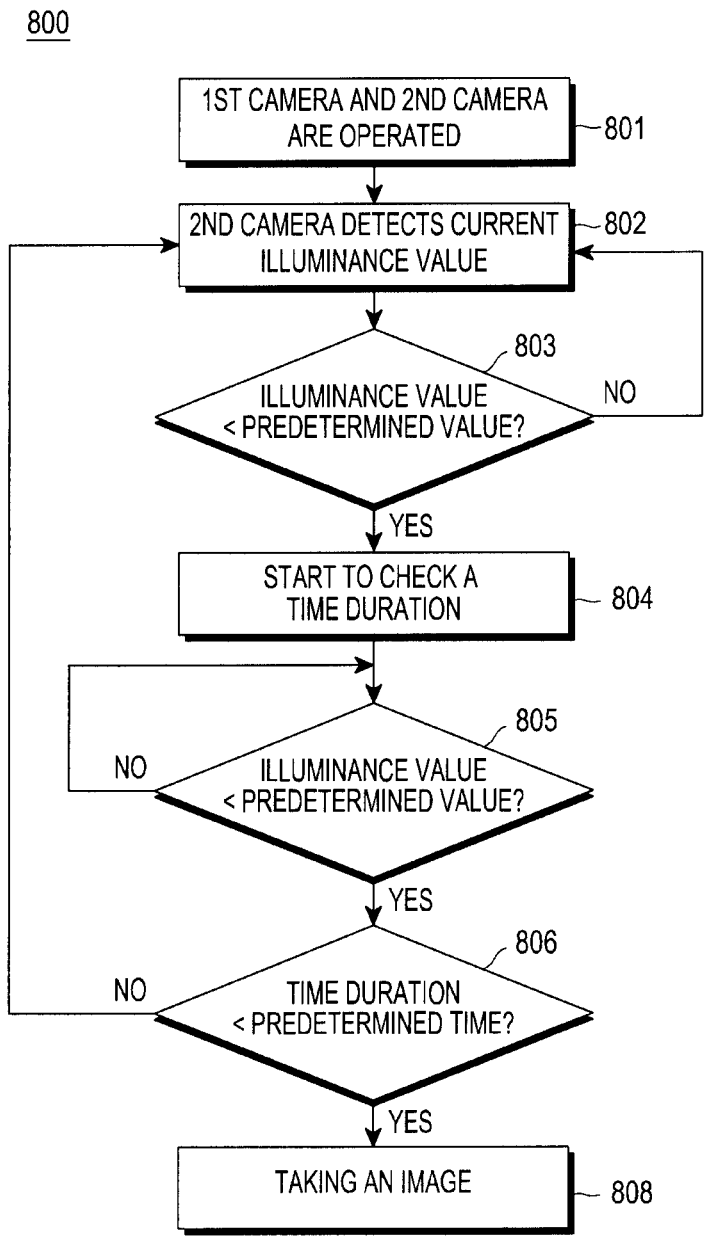
FIG. 8 is a flow diagram of another example method in accordance with aspects of the present disclosure.
Figure 9:
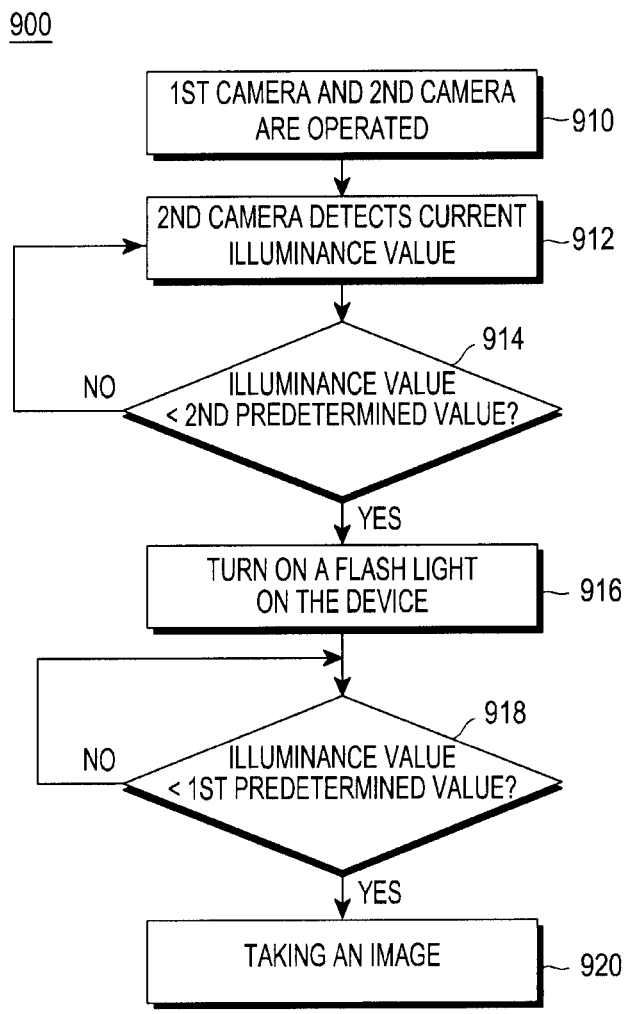
FIG. 9 is a flow diagram of yet another example method in accordance with aspects of the present disclosure.
Figure 10:
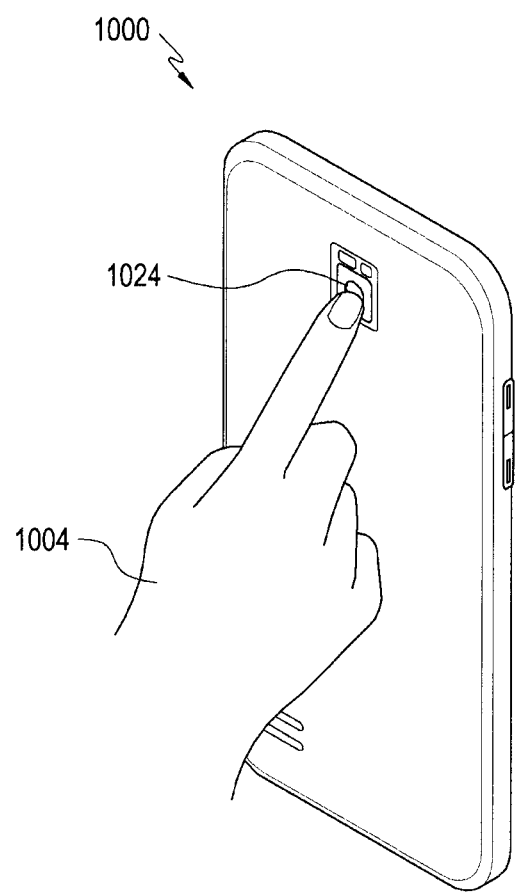
FIG. 10 is a working example in accordance with aspects of the present disclosure.
Figure 11:
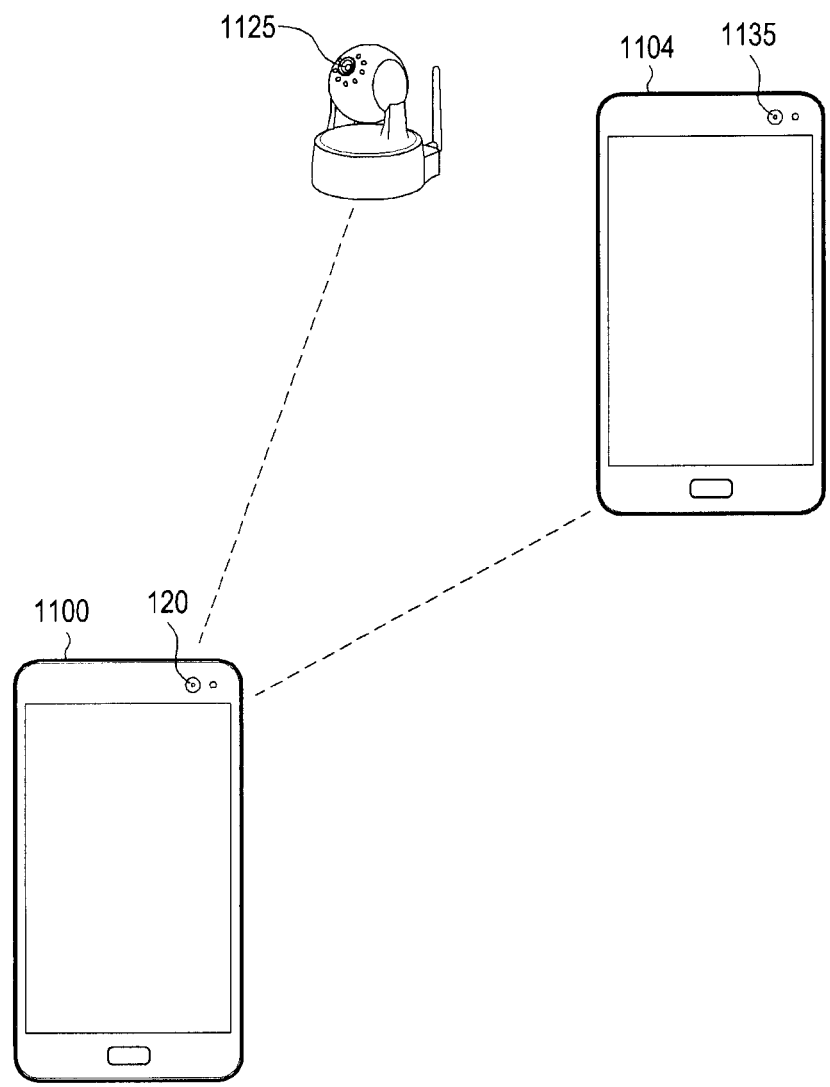
FIG. 11 is another working example in accordance with aspects of the present disclosure.
Figure 12:
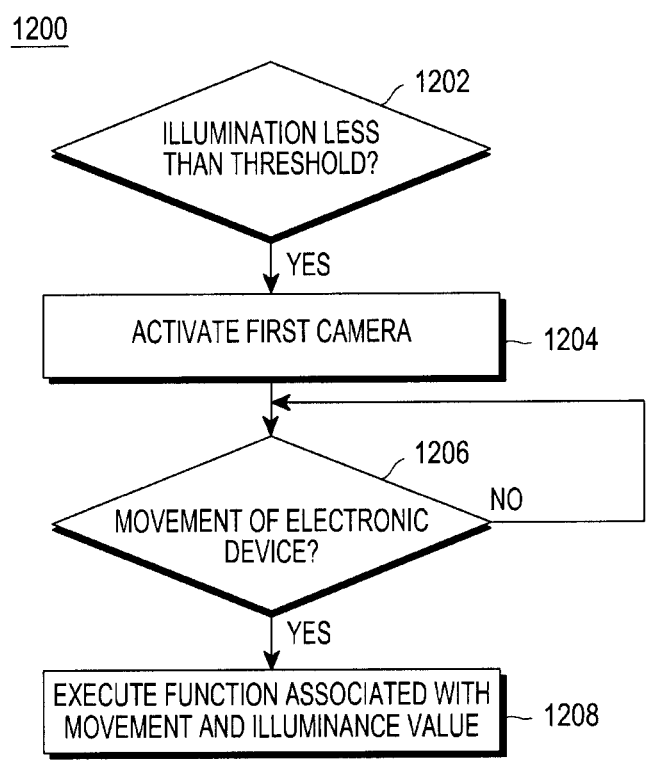
FIG. 12 is another flow diagram of a further example method in accordance with aspects of the present disclosure.
Figure 13:
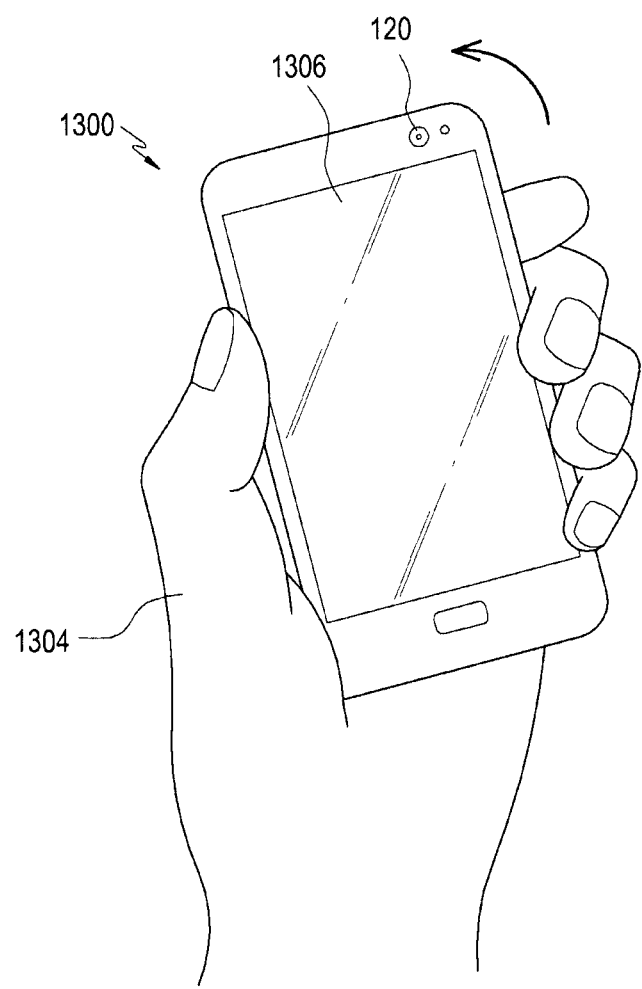
FIG. 13 is a further working example in accordance with aspects of the present disclosure.

Working examples of the electronic device and method are shown in FIGS. 7-12. In particular, FIGS. 7-9 illustrates a flow diagram of an example method for activating a camera based on an illuminance value and FIG. 10 shows a working example of method. Moreover, FIG. 12 illustrates a flow diagram of a method 1200 for executing a function based on an illuminance value and a movement of the electronic device. FIG. 13 shows a working example of method 1200. The actions shown in FIGS. 10 and 13 will be discussed below with regard to the flow diagrams of FIGS. 7 and 12 respectively.

Referring to FIG. 7, when both cameras are in operational as shown in block 720, one of the cameras detects, for example, a second camera 124 detects current illuminance value thereon as shown in block 740. Then, it is determined whether the illuminance by a second camera is less than a predetermined value as shown in block 760. Here, processor 115 may measure the illuminance received by the first camera 120 or the second camera 124 periodically in accordance with some predetermined cycle.

In one example, the predetermined value is not fixed but may vary in accordance with the overall surrounding illuminance. For example, the brightness perceived by a given camera may remain above the predetermined value, even when a user covers the camera with a finger. This may indicate that the brightness perceived by the cameras or the brightness of the device's surroundings is excessively high; in this instance, the predetermined value may be decreased to coincide with the brighter surroundings. Without such a decrease, camera activation may not be possible due to the excessive brightness perceived by the cameras. Furthermore, the surroundings of the device may also be excessively dark. For example, the device may be in a dark room or in a drawer such that the surrounding light is below the predetermined value, even when there is nothing obstructing the cameras; in this instance, the predetermined value may be increased to coincide with the darker surroundings. Without such an increase, the cameras may be activated automatically without the user's intent.

Referring back to FIG. 7, when the illuminance by the second camera 124 is less than a predetermined value as shown in block 760, the first camera 120 may be activated, as shown in block 780. In an alternate embodiment, activating a first camera 120 may include starting/stopping a video recording with first camera 120. It is understood that the first camera 120 may be arranged on front case and the second camera 124 may be arranged on rear case. Alternatively, the first camera 120 may be arranged on rear case and the second camera 124 may be arranged on front case or both cameras may be arranged together on front case or rear case.

Referring to FIG. 8, when a first camera 120 and a second camera 124 are operational, in block 801, the second camera 124 detects a current illuminance value as shown in block 802. Then, it is determined whether the illuminance value measured by the second camera 124 is less than a threshold value as shown in block 803. In one example, processor 115 may measure the illuminance received by first camera 120 or the second camera 124 periodically in accordance with some predetermined cycle.

If the illuminance value measured by the second camera 124 is less than a predetermined value, a duration of time in which the illuminance value is less than the predetermined value is measured as shown in block 804 and 805. When the illuminance value is no longer less than the predetermined value, then the time duration measured in the previous blocks is compared to a predetermined time as shown in block 806. When the measured time duration is less than the predetermined time, the first camera 120 is activated to capture an image as shown in block 808. In an alternate embodiment, a predetermined function other than the camera function can be activated. For example, a music function generating a particular audio data may be activated.

In another example, the threshold value is not fixed but may vary in accordance with the overall surrounding illuminance. For example, the brightness perceived by a given camera may remain above the threshold, even when a user covers the camera with a finger. This may indicate that the brightness perceived by the cameras or the brightness of the device's surroundings is excessively high; in this instance, the threshold may be decreased to coincide with the brighter surroundings. Without such a decrease, camera activation may not be possible due to the excessive brightness perceived by the cameras. Furthermore, the surroundings of the device may also be excessively dark. For example, the device may be in a dark room or in a drawer such that the surrounding light is below the threshold, even when there is nothing obstructing the cameras; in this instance, the threshold may be increased to coincide with the darker surroundings. Without such an increase, the cameras may be activated automatically without the user's intent.

Referring now to FIG. 10, a user 1004 is shown placing a finger before second camera 124 of an electronic device 1000. By placing the finger before second camera 124, the illuminance value detected by the second camera 124 decreases.

Referring back to FIG. 8, when the illuminance value falls below the illuminance threshold, a first camera 120 (or other predefined function) may be activated, as shown in block 808. Referring back to the working example of FIG. 10, upon placing the finger before second camera 124 and decreasing the illuminance value below the threshold value, the first camera 120 or other predefined function may be activated. In one example, activating first camera 120 may include taking a photograph with the first camera 120 or starting/stopping a video recording with first camera 120. Furthermore, while first camera 120 is active, images received by second camera 124 may be ignored.

In a further example, processor 115 may further consider the duration of time in which the illuminance received by the first or second camera falls below a threshold before activating the other camera. In one example, the predetermined time duration in which the illuminance falls below the threshold may be approximately 2 seconds. This time duration condition may prevent erroneous activation of the camera by an inadvertent movement by a user that may cause the illuminance value of the camera to decrease.

In yet another aspect, when the illuminance value detected by a camera falls below a threshold for a predetermined amount of time, other functions may be executed by the electronic device, such as, changing an operation mode of the device, changing the playback speed of a video playing on the device, or executing an application.

FIG. 9 is a flow chart illustrating the above operational steps according to the present disclosure.

As shown in FIG. 9, when a first camera 120 and a second camera 124 are operational, in block 910, the second camera 124 detects a current illuminance value as shown in block 912. Then, it is determined whether the illuminance value by a second camera 124 is less than a predetermined threshold value as shown in block 914. Here, processor 115 may alternatively measure the illuminance received by first camera 120 periodically in accordance with some predetermined cycle.

If the illuminance value is less than a predetermined threshold value, a flash light is turned on as shown in block 916. When the illuminance value is less than another predetermined threshold value in block 918, the first camera is activated to capture an image as shown in block 920.

Moreover, a user may partially cover second camera 124 to execute additional functions. For example, processor 115 may detect a finger partially covering second camera 124 at a specific angle such that the processor associates this angle with a certain function. Such a function may include, but is not limited to, fast forwarding or rewinding a video, ignoring a phone call, reading a message, or reading a text.

In another example, processor 115 may identify whether the illuminance value falls below a second threshold value before activating the other camera. For example, a user may place a finger before second camera 124 in order to activate first camera 120. However, the desired photograph may be in a dark environment. Thus, processor 115 may use the first threshold to identify whether another camera should be activated and the second threshold may be used to identify whether to activate the flash module (e.g., flash module 180 of FIG. 1) in the other camera, if the other camera is so equipped.

In another aspect, as shown in FIG. 11, processor 115 may detect illuminance values received by cameras arranged on a remote electronic device 1104 using communication unit 160. In turn, processor 115 may execute a function locally based on illuminance values from a camera positioned on the remote device 1104. The local functions that may be triggered may include photographing a picture with first camera 120 or second camera 124; recording a video with first camera 120 or second camera 124; or, executing an application. That is, the examples mentioned above may also be carried out based on illuminance values detected by a remote camera 1125 or 1135.

Referring now to FIG. 12, a further example method of the present disclosure is shown. Processor 115 may determine whether an illuminance value of second camera 124 falls below a predetermined threshold, as shown in block 1202. Referring now to FIG. 13, a user 1304 is shown placing a finger before a second camera 124 of an electronic device 1300. In this example, the second camera 124 is positioned on the rear side of the device on which display unit 1306 is arranged. Referring back to FIG. 12, when the illuminance value received from the second camera 124 falls below a threshold, a first camera 120 may be activated, as shown in block 1204.

Referring again to FIG. 12, processor 115 may detect a movement of the electronic device, as shown in block 1206. Processor 115 may execute a function associated with a combination of the movement and the illuminance value detected from the second camera 124, as shown in block 1208. Referring back to FIG. 13, the user 1304 is shown covering second camera 124 with a finger at the rear of the device and rotating electronic device 1300. A sequence that includes an illuminance value falling below a threshold and a particular movement of the device may be stored in storage unit 110; storage unit 110 may further store an association between this sequence and an application of the device. Accordingly, when the lowered illuminance value and the movement are detected, processor 115 may execute a predefined application and/or function associated with this sequence.

Advantageously, the above-described electronic device and method allow a user to activate a camera of an electronic device by lowering the illuminance value received by another camera on the device. Thus, a user may, for example, place a finger before a first camera of the device, in order to take a photo or record a video with a second camera. In turn, the desired photo or video may be clearer than those taken with conventional device cameras, since the device disclosed herein does not shake or rattle when the camera is activated. Furthermore, associations may be stored between an application and a movement-illuminance sequence so as to allow a user to cover a camera on the device with a finger and move the device to execute a function.

In an alternate embodiment, the teachings of the present disclosure can expand to other applications and/or slightly modified to implement other functions. That is, different associations may be stored between an application and a movement-illuminance event or sequence so as to execute a specific function when a user covers one of the cameras on the device according to a predefined manner. For example, the electronic device can detect a direction of user's finger covering the first or second camera based on the change in the illuminance value when detecting an approach of a finger, then execute or activate a particular application depending on the determined direction. That is, if a movement of a finger covering one of the cameras is detected from a left to a right direction, the device can be configured to execute a gallery application, for example, to review the pictures stored in the device. If the detected movement based on the change of the illuminance value occurs from a right side to a left side, for example, the device can be configured to execute or activate the camera in a panorama mode instead of a normal view and ascertain a capture of the panoramic view.

In another embodiment, the device can execute a specific function by varying the illuminance value through manipulating a finger covering one of the cameras during an operation of at least one event, such as alarm, call, message, mail and so on. For example, when an alarm is on at a given moment, the act of covering one of the camera with a finger can serve to stop the alarm sound. As another example, when there is an incoming call, a mere covering of one of the camera with a finger can be activate the device to receive or ignore the incoming call. Alternatively, the device can execute a shutter function by covering or uncovering the camera. For example, if a user is covering a rear camera with a finger, the device can be preprogrammed to activate a preview mode and then when the user uncovers the rear camera, the device can be configured to take a picture. Alternatively, if the user covers a half portion of the rear camera with his or her finger, the device can activate a preview mode, and then if the user covers the rear camera entirely, the device can take a picture. In yet another embodiment, while the device is in a playback mode, a detection of change in the illuminance value as the finger gradually covers the camera, the speed of a playback can vary. For example, if a user covers the rear or front camera, the replay speed is set at a normal speed, but as a user removes the finger from the camera, the replay speed can be increased gradually. Conversely, if a user covers a portion of the camera gradually, the replay speed can be decreased gradually, and when the camera is fully covered by the finger, the replay speed can be fixed back to the normal speed.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. An electronic device comprising:
a housing;
a first camera positioned at a first side of the housing;
a second camera positioned at a second side of the housing opposite the first side;
a processor electrically coupled to the first camera and the second camera; and
a memory storing instructions that, when executed, cause the processor to:
determine, while the first camera is active, whether an illuminance value of light received by the second camera is less than an illuminance value threshold, and
execute a shutter function associated with the first camera to photograph a picture when the illuminance value is less than the illuminance value threshold.

2. The electronic device of claim 1, wherein the first camera is positioned on a front or rear side of the electronic device, and the second camera is positioned on a rear or front side of the electronic device, respectively.

3. The electronic device of claim 1, wherein identifying whether the illuminance value received by the second camera is less than the illuminance value threshold occurs as the second camera is gradually covered by an object.

4. An electronic device comprising:
a housing;
a first camera positioned at a first side of the housing;
a second camera positioned at a second side of the housing opposite the first side;
a processor electrically coupled to the first camera and the second camera; and
a memory storing instructions that, when executed, cause the processor to:
determine, while the first camera is active, whether an illuminance value of light received by the second camera is less than an illuminance value threshold as the second camera is gradually covered by an object during a gradual movement of the object,
determine a direction of the gradual movement of the object as it gradually covers the second camera, and
execute a particular function associated with the first camera based on the determined direction, when the illuminance value is less than the illuminance value threshold.

5. The electronic device of claim 3, wherein the processor is further configured to determine an amount of area covering over the second camera by the object; and, execute a particular function by the first camera based on the determined amount of the area.

6. The electronic device of claim 3, wherein the processor is further configured to detect whether the second camera is uncovered by the object, and execute a particular function by the first camera based on the detected outcome.

7. The electronic device of claim 1, wherein during video recording, a recording state is changed from a resume recording state to a stop recording state, or vice versa, in response to the illuminance value being less than the illuminance value threshold.

8. The electronic device of claim 1, wherein the processor further is configured to:
identify whether the illuminance value received by the second camera is less than a second illuminance threshold; and
activate a flash module when the illuminance value received by the second camera is less than the second illuminance threshold.

9. The electronic device of claim 1, wherein the processor is further configured to identify whether the illuminance value received by the second camera is less than the illuminance threshold for a predetermined duration of time, and if so, the shutter function is executed; if not, the shutter function is not executed.

10. The electronic device of claim 1, wherein the processor further configured to:
detect a movement of the electronic device; and
execute a function associated with a combination of the movement and the illuminance value received by the second camera.

11. The electronic device of claim 1, wherein the processor further configured to detect illuminance values detected by at least one camera provided in a remote electronic device via a communication unit.

12. A method for operating an electronic device, the method comprising:
exposing, by an electronic device including a first camera and a second camera, the second camera to light;
determining, while the first camera is active, by the electronic device, whether an illuminance value of the light received by the second camera is less than an illuminance value threshold; and
executing, by the electronic device, a shutter function associated with the first camera to photograph a picture when the illuminance value is less than the illuminance value threshold.

13. The method of claim 12, wherein the first camera is positioned on a front side or a rear side of the electronic device, and the second camera is positioned on a rear side or a front side of the electronic device, respectively.

14. The method of claim 12, further comprising:
identifying, using at least one processor, whether the illuminance value received by the second camera is less than a second illuminance value threshold; and
activating, using at least one processor, a flash module when the illuminance value received by the second camera is less than the second illuminance value threshold.

15. The method of claim 12, wherein a recording state of the picture is changed from a resume recording state to a stop recording state, or vice versa, in response to the illuminance value being detected less than the illuminance value threshold.

16. The method of claim 12, further comprising deactivating, using at least one processor, the first camera when the illuminance value received by the second camera is less than the illuminance value threshold.

17. The method of claim 12, further comprising:
detecting, using at least one processor, a movement of the electronic device; and
executing, using at least one processor, a function associated with a combination of the movement and the illuminance value received by the first camera.

18. The method of claim 12, wherein the first camera and the second camera are positioned on a remote electronic device.

19. The method of claim 12, wherein identifying whether the illuminance value received by the second camera is less than the illuminance value threshold occurs as the second camera is gradually covered by an object.

20. The method of claim 19, further comprising determining a direction of movement of the object gradually covering the second camera; and, executing a particular function by the first camera based on the determined direction.

21. The method of claim 20, further comprising determining an amount of area of the object covering the second camera by the object; and executing a particular function by the first camera based on the determined amount of the area.

22. The method of claim 20, further comprising detecting whether the second camera is uncovered by the object, and executing a particular function by the first camera based on the detected outcome.

23. The method of claim 21, wherein the function is executed while the electronic device is running a specific application.

24. A non-transitory computer-readable storage medium storing one or more programs comprising instructions which, when executed by an electronic device, cause the device to execute the method according to claim 12.

25. The electronic device of claim 4, wherein when the illuminance value is less than the illuminance value threshold, the processor is configured to:
execute a first camera-related function if the determined direction matches a first predefined direction; and
execute a second camera-related function different from the first camera-related function if the determined direction matches a second direction opposite the first direction.

* * * * *